Patented Feb. 11, 1947

2,415,464

UNITED STATES PATENT OFFICE 2,415,464

PROCESS FOR AMMONIATING ACID PHOSPHATES

Eugene D. Crittenden, Petersburg, Va., ass'gnor to The Solvay Process Company, New York, N. Y., a corporation of New York No Drawing. Application July 3, 1943, Serial No. 493,467

14 Claims. (Cl. 71—29)

This invention is directed to a process for the production of fertilizers by the ammoniation of an acid phosphate.

The ammoniation of an acid phosphate (superphosphate or triple superphosphate), to produce fertilizer materials containing nitrogen and phosphorus has been in extensive use in the past. The procedures heretofore employed involved treating an acid phosphate with neutralizing ammonia, with or without other materials which it is desired to add to the acid phosphate. For example, acid phosphates have been treated with aqua or anhydrous ammonia to form an ammoniated superphosphate which is frequently mixed with other materials to form a complete fertilizer. In place of the ammonia considerable use has been made of ammoniacal solutions of desired fertilizer ingredients. For example, acid phosphates are ammoniated by mixing them with ammoniacal solutions of ammonium nitrate, such as a solution of 60% ammonium nitrate in 20% ammonia and 20% water. Ammoniacal solutions containing urea have also been used. One such solution contains about 43% urea, 17.8% water, 8½% carbon dioxide and 30½% ammonia, both free and combined with the carbon dioxide as ammonium carbonate or carbamate. It is also known to mix superphosphate with solid ammonium carbonate or carbamate or solutions thereof to neutralize the acidity of the superphosphate or to react with the calcium sulfate present in the superphosphate to form ammonium sulfate and calcium carbonate.

In ammoniating acid phosphates the so-called neutralizing ammonia (i. e., ammonia present either as uncombined $NH_3$ or combined with carbon dioxide) reacts with the acidic constituents of the acid phosphate. The chemical reactions whereby ammonia neutralizes the acidic constituents of the acid phosphate are exothermic when using uncombined ammonia. The heat evolved by the reaction materially raises the temperature of the acid phosphate ammoniated with uncombined ammonia. For example, addition to superphosphate having a temperature of 26° C. of the above-described ammoniacal solution of ammonium nitrate also at 26° C. in amounts supplying 25 to 50 pounds neutralizing ammonia for every 1000 pounds of superphosphate, results in an immediate rise in temperature of the mixture to about 50° C. or higher. Employing the above-described ammoniacal urea solution in amounts sufficient to supply 25 to 50 pounds neutralizing ammonia per 1000 pounds superphosphate and mixing the materials having a temperature of 26° C., the resulting mixture heats up to about 40° C. or higher.

It is customary fertilizer practice to mix the ammoniating material with the acid phosphate and hold the mixture in large storage piles or bins for a long period of time during which the chemical reactions go substantially to completion, the material dries out and after being broken up is ready for shipment. This is called the curing stage of manufacturing the fertilizer. Even fater curing the material is often stored for long periods in the pile or bin before it is taken out for shipment. The storage of the solid in large piles or bins approximates adiabatic conditions in that heat is lost very slowly from the mass as a whole and the warm mixture in the curing piles or bins retains an elevated temperature for long periods of time. As a result of the ammoniation treatment some of the available $P_2O_5$ of the acid phosphate is reverted to unavailable $P_2O_5$. By available $P_2O_5$ I refer to that which is shown to be citrate-soluble by the standard method of the A. O. A. C. (Association of Agricultural Chemists). By unavailable $P_2O_5$ I refer to the $P_2O_5$ which is shown as citrate-insoluble by the standard A. O. A. C. tests. The disadvantage of this reversion of available $P_2O_5$ in ammoniating acid phosphates has long been recognized. The art has also recognized that an important factor tending to increase the amount of reverted $P_2O_5$ is the heating up of the material by the ammoniation and the material remaining at elevated temperatures for prolonged periods of time in the curing and storage piles or bins.

It is an object of this invention to provide a process for ammoniating acid phosphates in which heat evolved by the exothermic reaction of free ammonia with the acid phosphate is absorbed by an endothermic reaction of certain ammonium salts with the acid phosphate. The invention provides a preferred process in which the overall reaction of neutralizing ammonia with the acid phosphate results in little or no evolution of heat and the ammoniated acid phosphate in the curing period and during storage is at temperatures not substantially above that of the materials before mixing. By providing a method whereby acid phosphates may be ammoniated, cured and stored, without being at elevated temperatures for long periods of time, there is materially less reversion of available $P_2O_5$ in the acid phosphate to unavailable $P_2O_5$ in the ammoniated product.

I have discovered that the reaction of solid ammonium carbonates with the acidic constituents of acid phosphates is markedly endothermic. Instead of the ammoniation of the acid phosphate by the ammonium corbonates being accompanied by the evolution of heat, heat is absorbed in substantial amounts and is taken up from the reactants. Instead of the products being heated to a temperature higher than that of the reactants at the time of mixing, the product is cooled by the reaction itself. For example, commercial ammonium bicarbonate containing about 22% $NH_3$ was mixed with a superphosphate contaning about 18% $P_2O_5$ in amount such that there was 25 pounds neutralizing ammonia supplied by the ammonium bicarbonate for every 1000 pounds superphosphate. Both materials had a temperature of 26° C. before mixing. The mixture was held under substantially adiabatic conditions. Two hours after mixing the mixture was at a temperature of 13° C. Increasing the proportion of ammonium bicarbonate to superphosphate so as to supply 50 pounds neutralizing ammonia per 1000 pounds superphosphate resulted in a mixture which two hours after the ingredients were mixed had a temperature of 8° C.

This discovery of the endothermic nature of the reaction of solid ammonium carbonates with acid phosphates led to the development of the process of my invention. That process modifies the known treatment of acid phosphates with free ammonia, which results in a rise in temperature of the ammoniated material, by reacting with the acid phosphate a solid ammonium carbonate to absorb by the endothermic reaction of the ammonium carbonate heat evolved by the exothermic reaction of the free ammonia and thus limit reversion of $P_2O_5$ which would otherwise result from the heating of the ammoniated material by the exothermic reaction. For a clear understanding of my invention it should be pointed out that in prior practice reversion of $P_2O_5$ occurred at two stages of the process. There was what is known as immediate reversion, which occurs when the ammonia and acid phosphate are mixed. There was also the progressive reversion which subsequently occurred and the extent of which was principally a function of time and temperature conditions under which the ammoniated material was held. The process of my invention is concerned with limiting this progressive reversion during prolonged storage of the ammoniated material.

In employing the process of my invention for the ammoniation of acid phosphates, the acid phosphate is treated both with solid ammonium carbonate (by which term I refer to ammonium bicarbonate, normal ammonium carbonate or ammonium carbamate) and uncombined neutralizing ammonia, in addition to the neutralizing ammonia contained in the solid ammonium carbonate. This uncombined ammonia amounts to at least 15 pounds $NH_3$ for every 1000 pounds of the acid phosphate, an amount which would cause a substantial rise in temperature of the ammoniated material. This uncombined neutralizing ammonia may be supplied, as heretofore in ammoniating acid phosphates, as aqua ammonia or liquid or gaseous ammonia or as an ammoniacal solution of a fertilizer salt, such as the ammoniacal ammonium nitrate or ammoniacal urea solutions referred to above. The solid ammonium carbonate is employed in amount such that the heat evolved by the exothermic reaction of the uncombined ammonia with the acid phosphate is not substantially greater than the heat absorbed by the endothermic reaction of the solid ammonium carbonate with the acid phosphate. This is accomplished by employing the ammoniating materials in such proportions that the ratio of neutralizing ammonia supplied as solid carbonate to total neutralizing ammonia supplied both as solid carbonate and as free ammonia is at least 0.4:1. It is preferred that this ratio be at least 0.6:1. The overall reaction is then substantially non-exothermic and after addition of the solid carbonate little or no reversion due to the temperature of the material being elevated by the ammoniation reactions occurs.

The total amount of neutralizing ammonia used in carrying out this invention must be limited so that the solid ammonium carbonate reacts with the acid constituents, liberating the carbon dioxide, and the ammonia combines with the acid phosphate. The ammoniated product retains substantially none of the $CO_2$ supplied as ammonium carbonate. It is still acidic, with a pH not higher than 5, as determined by mixing the ammoniated phosphate with sufficient distilled water to form a thick paste in which the glass electrode bulb of a pH meter is immersed.

The solid ammonium carbonate is preferably mixed with the superphosphate at substantially the same time as the uncombined ammonia is added thereto. The heat absorbed by the endothermic reaction of the solid ammonium carbonate thus neutralizes heat evolved by the exothermic reaction of the uncombined ammonia and the latter does not cause the ammoniated material to be heated to sufficiently elevated temperatures to cause reversion of the $P_2O_5$ even during prolonged storage. The solid ammonium carbonate may be added to the acid phosphate prior to the addition of the uncombined ammonia but the latter is added before the acid phosphate has absorbed from its surroundings the heat taken up by the endothermic reaction with the solid ammonium carbonate. Also, the solid ammonium carbonate may be added a short time after the addition of the uncombined ammonia but before a long enough period of time has elapsed for the elevated temperature of the acid phosphate induced by the exothermic reaction of the uncombined ammonia to have a substantial effect upon the amount of $P_2O_5$ reverted to unavailable $P_2O_5$ by the ammoniation treatment. It is preferred to substantially simultaneously treat the acid phosphate both with the solid ammonium carbonate and with the uncombined ammonia. The reaction with the uncombined ammonia takes place more quickly than with the solid carbonate so there is generally a temporary rise in temperature of the material immediately upon mixing. However, the heat evolved by the exothermic reaction is promptly neutralized by the absorption of heat by the endothermic reaction of the solid carbonate. Since the reversion of $P_2O_5$ progresses during long periods of storing the ammoniated phosphate, the advantages of my process can be obtained at least in part by mixing the solid ammonium carbonate with ammoniated phosphate at any time before the heat liberated by the exothermic reaction of the uncombined ammonia and the phosphate has been dissipated from the ammoniated phosphate; i. e., while the ammoniated phosphate still retains heat evolved by the exothermic ammoniation reaction and as a result thereof is at an elevated temperature. By adding the solid carbonate the heat is neutralized, the temperature of the material is lowered and reversion which would have continued to occur as a result of the higher temperature is prevented.

The following examples are illustrative of the processes of my invention:

*Example 1.*—Commercial, solid ammonium bicarbonate containing about 22% $NH_3$ and an ammoniacal solution of ammonium nitrate (66.5% ammonium nitrate, 21.7% ammonia and 13.3% water) were substantially simultaneously added to and mixed with superphosphate. The materials were mixed in proportions such that 50 pounds neutralizing ammonia were added for every 1000 pounds superphosphate. One-half of the neutralizing ammonia was supplied by the ammoniacal ammonium nitrate solution and one-half by the solid ammonium bicarbonate. The several ingredients were at 26° C. before being mixed. After holding the mixture for two hours under substantially adiabatic conditions, the temperature of the mixture was 18° C. After storage for 30 days at room temperature (about 25° C.), analysis of its $P_2O_5$ content showed 4.7% of the total $P_2O_5$ of the superphosphate reverted to citrate-insoluble $P_2O_5$ in the ammoniated product.

When the same superphosphate was ammoniated with the ammoniacal ammonium nitrate solution alone supplying 50 pounds neutralizing ammonia per 1000 pounds superphosphate, the temperature of the mixture upon ammoniation attained 61–70° C. with the materials being at a temperature of 26° C. before mixing. After storage for 30 days of the ammoniated products at these elevated temperatures analysis of the products of two preparations showed 11.9% and 12.7% of the total $P_2O_5$ of the superphosphate reverted by the ammoniation treatment to citrate-insoluble $P_2O_5$ in the ammoniated product.

In the above example, the ammonium bicarbonate may be substituted by solid ammonium carbamate or normal ammonium carbonate in amount providing 25 pounds neutralizing ammonia for every 1000 pounds superphosphate. In these cases, the temperature two hours after mixing may be somewhat higher than 18° C. but it will not exceed the temperature of the materials at the time they were mixed.

*Example 2.*—The same superphosphate as used in Example 1 was introduced into a mixer and to it was added solid commercial ammonium bicarbonate and an ammoniacal solution of urea, containing 43.1% urea, 30.6% $NH_3$, 8.5% $CO_2$ and 17.8% $H_2O$. About 50 pounds of neutralizing ammonia were thus added for every 1000 pounds of superphosphate. Half of this ammonia was provided by the ammonium bicarbonate and the other half by the ammoniacal solution of urea. The materials prior to mixing were at about 26° C. As a result of the chemical reactions taking place in mixing these materials the temperature of the mixture fell to 15° C. two hours after mixing. The resulting product after storage for 30 days at 25° C. showed 4.5% of the total $P_2O_5$ content of the superphosphate reverted to citrate-insoluble $P_2O_5$.

Two batches of the same superphosphate were ammoniated with the same urea-ammonia solution in amount sufficient to supply the total 50 pounds neutralizing ammonia to 1000 pounds superphosphate. As a result of mixing these materials their temperature rose from 26° C. to 56° C. in the one batch for which this temperature was determined. During 30 days storage of the ammoniated products, one at 50° C. and the other at 60° C., 12.6% and 26.3%, respectively, of the total $P_2O_5$ of the superphosphate was reverted to citrate-insoluble $P_2O_5$.

I claim:

1. The process for producing an ammoniated acid phosphate fertilizer which comprises reacting an acid phosphate with both uncombined ammonia amounting to at least 15 pounds $NH_3$ for every 1000 pounds of the acid phosphate and ammonia combined in a solid ammonium carbonate in total amounts of said uncombined and combined ammonia such that the resulting ammoniated phosphate has a pH no higher than 5, and in a proportion such that the ratio of neutralizing ammonia in the solid carbonate to the total neutralizing ammonia reacted with the acid phosphate is at least 0.4:1, said solid ammonium carbonate being added to the acid phosphate before the heat evolved by the exothermic reaction of the uncombined ammonia with the acid phosphate has been dissipated from the ammoniated phosphate, whereby the endothermic heat of reaction of the ammonium carbonate with the acid phosphate neutralizes heat liberated by said exothermic reaction.

2. The process for producing an ammoniated acid phosphate fertilizer which comprises reacting an acid phosphate at substantially the same time with a solid ammonium carbonate and with uncombined ammonia which reacts exothermically with the acid phosphate in addition to the neutralizing ammonia contained in said solid ammonium carbonate, said solid ammonium carbonate and uncombined ammonia being added to the acid phosphate in proportions such that the ratio of neutralizing ammonia in the solid carbonate to the total neutralizing ammonia reacted with the acid phosphate is at least 0.4:1, at least 15 pounds uncombined $NH_3$ are added for every 1000 pounds of the acid phosphate, and the resulting ammoniated superphosphate has a pH no higher than 5, whereby heat of reaction of said uncombined ammonia with the acid phosphate is neutralized by the endothermic heat of reaction of the ammonium carbonate with the acid phosphate.

3. The process for producing an ammoniated acid phosphate fertilizer which comprises mixing an acid phosphate substantially simultaneously with a solid ammonium carbonate and with uncombined ammonia in addition to the neutralizing ammonia contained in said solid ammonium carbonate in amounts such that at least 15 pounds uncombined $NH_3$ are mixed with every 1000 pounds of the acid phosphate and the resulting ammoniated phosphate has a pH no higher than 5, said solid ammonium carbonate and uncombined ammonia being added to the acid phosphate in a proportion such that the ratio of neutralizing ammonia in the solid carbonate to the total neutralizing ammonia added to the acid phosphate is at least 0.6:1, whereby the heat evolved by the exothermic reaction of the uncombined ammonia with the acid phosphate is not substantially greater than the heat absorbed by the endothermic reaction of the solid ammonium carbonate with the acid phosphate, and thereafter storing the ammoniated acid phosphate for a prolonged period of time under conditions approximating adiabatic.

4. The process for producing an ammoniated acid phosphate fertilizer which comprises mixing an acid phosphate substantially simultaneously with uncombined ammonia which reacts exothermically therewith and with solid ammonium bicarbonate in proportions such that the ratio of neutralizing ammonia in the solid carbonate to the total neutralizing ammonia reacted with the acid phosphate is at least 0.4:1, at least 15 pounds uncombined NH₃ are added for every 1000 pounds of the acid phosphate, and the resulting ammoniated superphosphate has a pH no higher than 5, whereby heat of reaction of said uncombined ammonia with the acid phosphate is neutralized by the endothermic heat of reaction of the ammonium bicarbonate with the acid phosphate and thereafter storing the ammoniated acid phosphate for a prolonged period of time under conditions approximating adiabatic.

5. In the process for ammoniating an acid phosphate to produce a fertilizer material by mixing said acid phosphate with an ammoniating agent containing uncombined ammonia, which agent reacts exothermically with the acid phosphate, and storing the ammoniated phosphate for long periods of time at elevated temperatures resulting from the heat of reaction of the acid phosphate and ammoniating agent, that improvement which comprises substituting for a portion of the neutralizing ammonia in said ammoniating agent, ammonia combined with carbon dioxide in the form of a solid carbonate in amount such that the ratio of neutralizing ammonia in the solid carbonate to the total neutralizing ammonia reacted with the acid phosphate is at least 0.4:1 and mixing said ammoniating agent and solid ammonium carbonate with said acid phosphate at substantially the same time and in amounts such that at least 15 pounds uncombined NH₃ is supplied for every 1000 pounds of the acid phosphate and the resulting ammoniated phosphate has a pH no higher than 5, whereby heat evolved by the exothermic reaction of the uncombined ammonia is absorbed by the endothermic reaction of the carbonate of ammonia and the ammoniated phosphate during storage remains at temperatures substantially lower than the aforesaid elevated temperatures.

6. In the process for ammoniating an acid phosphate to produce a fertilizer material by mixing said acid phosphate with an ammoniating agent containing uncombined ammonia, which agent reacts exothermically with the superphosphate, and storing the ammoniated phosphate for long periods of time at elevated temperatures resulting from the heat of reaction of the acid phosphate and ammoniating agent, that improvement which comprises substituting for a portion of the neutralizing ammonia in said ammoniating agent, solid ammonium bicarbonate in amount such that the ratio of neutralizing ammonia in the solid carbonate to the total neutralizing ammonia reacted with the acid phosphate is at least 0.6:1 and mixing said ammoniating agent and solid ammonium bicarbonate with said acid phosphate at substantially the same time and in amounts such that at least 15 pounds uncombined NH₃ is supplied for every 1000 pounds of the acid phosphate and the resulting ammoniated phosphate has a pH no higher than 5, whereby heat evolved by the exothermic reaction of the uncombined ammonia is absorbed by the endothermic reaction of the carbonate of ammonia and the ammoniated phosphate during storage remains at temperatures substantially lower than the aforesaid elevated temperatures.

7. The process for producing an ammoniated acid phosphate fertilizer which comprises mixing an acid phosphate at substantially the same time both with an ammoniacal solution of ammonium nitrate containing uncombined ammonia which reacts exothermically with the acid phosphate and with a solid ammonium carbonate in amounts such that the ratio of neutralizing ammonia in the solid carbonate to the total neutralizing ammonia reacted with the acid phosphate is at least 0.4:1, at least 15 pounds uncombined NH₃ are added for every 1000 pounds of the acid phosphate, and the resulting ammoniated phosphate has a pH no higher than 5, whereby the heat evolved by the exothermic reaction of the uncombined ammonia with the acid phosphate is not substantially greater than the heat absorbed by the endothermic reaction of the solid ammonium carbonate with the acid phosphate.

8. The process for producing a fertilizer material which comprises ammoniating an acid phosphate by the substantially simultaneous addition thereto of an ammoniacal solution of ammonium nitrate containing uncombined ammonia and solid ammonium bicarbonate in amounts such that the ratio of neutralizing ammonia in the solid carbonate to the total neutralizing ammonia reacted with the acid phosphate is at least 0.6:1, at least 15 pounds uncombined NH₃ are added for every 1000 pounds of the acid phosphate, and the resulting ammoniated phosphate has a pH no higher than 5, whereby the heat evolved by the exothermic reaction of the uncombined ammonia with the acid phosphate is not substantially greater than the heat absorbed by the endothermic reaction of the solid ammonium bicarbonate with the acid phosphate.

9. In the process for ammoniating an acid phosphate to produce a fertilizer material by mixing said acid phosphate with a solution which reacts exothermically therewith containing uncombined ammonia and ammonium nitrate and storing the ammoniated material for long periods of time at elevated temperatures caused by the exothermic reaction, that improvement which comprises substituting for a portion of said uncombined ammonia a solid ammonium carbonate in amount such that the ratio of neutralizing ammonia in the solid carbonate to the total neutralizing ammonia reacted with the acid phosphate is at least 0.6:1 and mixing said solution containing uncombined ammonia and ammonium nitrate and solid ammonium carbonate with said acid phosphate at substantially the same time and in amounts such that at least 15 pounds uncombined NH₃ is supplied for every 1000 pounds of the acid phosphate and the resulting ammoniated phosphate has a pH no higher than 5, whereby heat evolved by the exothermic reaction of the uncombined ammonia is absorbed by the endothermic reaction of the carbonate of ammonia and the ammoniated phosphate during storage remains at temperatures substantially lower than the aforesaid elevated temperatures.

10. In the process for ammoniating an acid phosphate to produce a fertilizer material by mixing said acid phosphate with a solution which reacts exothermically therewith containing uncombined ammonia and ammonium nitrate and storing the ammoniated material for long periods of time at elevated temperatures caused by the exothermic reaction, that improvement which comprises substituting for a portion of said uncombined ammonia solid ammonium bicarbonate in amount such that the ratio of neutralizing ammonia in the solid carbonate to the total neutralizing ammonia reacted with the acid phosphate is at least 0.6:1 and mixing said solution containing uncombined ammonia and ammonium nitrate and solid ammonium bicarbonate with said acid phosphate at substantially the same time and in amounts such that at least 15 pounds uncombined $NH_3$ is supplied for every 1000 pounds of the acid phosphate and the resulting ammoniated phosphate has a pH no higher than 5, whereby heat evolved by the exothermic reaction of the uncombined ammonia is absorbed by the endothermic reaction of the carbonate of ammonia and the ammoniated phosphate during storage remains at temperatures substantially lower than the aforesaid elevated temperatures.

11. The process for producing an ammoniated acid phosphate fertilizer which comprises mixing an acid phosphate at substantially the same time both with an ammoniacal solution of urea containing uncombined ammonia and at least one compound of ammonia and carbon dioxide from the group consisting of ammonium carbamate and the carbonates of ammonia, which solution reacts exothermically with the acid phosphate, and with a solid ammonium carbonate in amounts such that the ratio of neutralizing ammonia in the solid carbonate to the total neutralizing ammonia reacted with the acid phosphate is at least 0.4:1, at least 15 pounds uncombined $NH_3$ are added for every 1000 pounds of the acid phosphate, and the resulting ammoniated phosphate has a pH no higher than 5, whereby the heat evolved by the exothermic reaction of the uncombined ammonia with the acid phosphate is not substantially greater than the heat absorbed by the endothermic reaction of the solid ammonium carbonate with the acid phosphate.

12. In the process for ammoniating an acid phosphate to produce a fertilizer material by mixing said acid phosphate with a solution which reacts exothermically therewith containing uncombined ammonia, and urea and at least one compound of ammonia and carbon dioxide from the group consisting of ammonium carbamate and the carbonates of ammonia, and storing the ammoniated material for long periods of time at elevated temperatures caused by the exothermic reaction, that improvement which comprises substituting for a portion of the uncombined ammonia contained in said solution a solid ammonium carbonate in amount such that the ratio of neutralizing ammonia in the solid carbonate to the total neutralizing ammonia reacted with the acid phosphate is at least 0.6:1 and mixing said solution and solid ammonium carbonate with said acid phosphate at substantially the same time and in amounts such that at least 15 pounds uncombined $NH_3$ is supplied for every 1000 pounds of the acid phosphate and the resulting ammoniated phosphate has a pH no higher than 5, whereby heat evolved by the exothermic reaction of the uncombined ammonia is absorbed by the endothermic reaction of the carbonate of ammonia and the ammoniated phosphate during storage remains at temperatures substantially lower than the aforesaid elevated temperatures.

13. In the process for ammoniating an acid phosphate to produce a fertilizer material by mixing said acid phosphate with a solution which reacts exothermically therewith containing uncombined ammonia, and urea and at least one compound of ammonia and carbon dioxide from the group consisting of ammonium carbamate and the carbonates of ammonia, and storing the ammoniated material for long periods of time at elevated temperatures caused by the exothermic reaction, that improvement which comprises substituting for a portion of the uncombined ammonia contained in said solution solid ammonium bicarbonate in amount such that the ratio of neutralizing ammonia in the solid carbonate to the total neutralizing ammonia reacted with the acid phosphate is at least 0.6:1 and mixing said solution and solid ammonium bicarbonate with said acid phosphate at substantially the same time and in amounts such that at least 15 pounds uncombined $NH_3$ is supplied for every 1000 pounds of the acid phosphate and the resulting ammoniated phosphate has a pH no higher than 5, whereby heat evolved by the exothermic reaction of the uncombined ammonia is absorbed by the endothermic reaction of the carbonate of ammonia and the ammoniated phosphate during storage remains at temperatures substantially lower than the aforesaid elevated temperatures.

14. The process for producing an ammoniated superphosphate fertilizer, whereby reversion to the citrate-insoluble form is prevented, which comprises mixing an acid superphosphate substantially simultaneously with uncombined ammonia, which reacts exothermically therewith, and with solid ammonium bicarbonate, which reacts endothermically therewith, in proportions such that there are added at least 15 pounds of uncombined ammonia for every 1000 pounds of the acid phosphate present, and the ratio of solid ammonium bicarbonate to the total neutralizing ammonia reacted with the acid phosphate is such that the heat absorbed during the endothermic neutralization with ammonium bicarbonate is substantially equivalent to the heat given off during the exothermic neutralization with the uncombined ammonia, whereby reversion of the phosphate to the citrate-insoluble form due to a rise in temperature is prevented.

EUGENE D. CRITTENDEN.

REFERENCES CITED

The following references are of record in the file of this patent:

UNITED STATES PATENTS

| Number | Name | Date |
|---|---|---|
| 1,913,791 | Carothers | June 13, 1933 |
| 1,948,520 | Harvey | Feb. 27, 1934 |
| 1,949,129 | Oehme | Feb. 27, 1934 |
| 2,048,658 | Jannek | July 21, 1936 |
| 2,102,831 | Brill | Dec. 21, 1937 |
| 2,279,200 | Keenen | Apr. 7, 1942 |

FOREIGN PATENTS

| Number | Country | Date |
|---|---|---|
| 9,636 | British | 1886 |
| 299,796 | British | 1928 |
| 375,461 | British | Sept. 24, 1931 |
| 351,130 | German | Apr. 1, 1922 |